US012696187B2

(12) United States Patent
Wang et al.

(10) Patent No.: US 12,696,187 B2
(45) Date of Patent: Jul. 28, 2026

(54) COMPONENT CARRIER GROUPING FOR CARRIER AGGREGATION IN WIRELESS COMMUNICATION NETWORKS

(71) Applicant: T-MOBILE INNOVATIONS LLC, Overland Park, KS (US)

(72) Inventors: Yu Wang, Fairfax, VA (US); Zheng Fang, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 366 days.

(21) Appl. No.: 18/427,914

(22) Filed: Jan. 31, 2024

(65) Prior Publication Data

US 2025/0247781 A1     Jul. 31, 2025

(51) Int. Cl.
*H04W 48/20* (2009.01)
*H04B 17/318* (2015.01)
*H04W 24/10* (2009.01)

(52) U.S. Cl.
CPC .......... *H04W 48/20* (2013.01); *H04B 17/328* (2023.05); *H04W 24/10* (2013.01)

(58) Field of Classification Search
CPC ..... H04W 48/20; H04W 24/10; H04B 17/328
See application file for complete search history.

(56) References Cited

U.S. PATENT DOCUMENTS

| | | | |
|---|---|---|---|
| 10,270,570 B2 | 4/2019 | Liu et al. | |
| 10,813,136 B2 | 10/2020 | Yerramalli et al. | |
| 10,924,228 B2 | 2/2021 | Liu et al. | |
| 11,290,146 B2 | 3/2022 | Yi | |
| 11,737,069 B2* | 8/2023 | Hou ..................... | H04B 17/318 |
| | | | 370/329 |
| 2015/0230206 A1* | 8/2015 | Tabet ................... | H04W 72/02 |
| | | | 370/329 |
| 2022/0022250 A1* | 1/2022 | Cirik ................. | H04W 74/0833 |

* cited by examiner

*Primary Examiner* — Derrick W Ferris
*Assistant Examiner* — Jesse P. Samluk

(57) ABSTRACT

Various embodiments comprise a wireless access node to group component carriers for carrier aggregation. In some examples, the wireless access node comprises node circuitry and radio circuitry. The node circuitry selects primary and secondary cell candidates based on carrier aggregation capability, transmit power, and radio frequency measurements for a wireless user device. The node circuitry filters the cell candidates based on the bandwidth, loading, and data buffer status for the cell candidates. The node circuitry selects a primary cell and at least one secondary cell from the filtered cell candidates based on an operator defined rule, interference, and cell Key Performance Indicators (KPIs) for the selected primary cell and the at least one selected secondary cell. The radio circuitry wirelessly indicates the selected primary cell and the selected secondary cell(s) to the wireless user device to use for carrier aggregation.

20 Claims, 10 Drawing Sheets

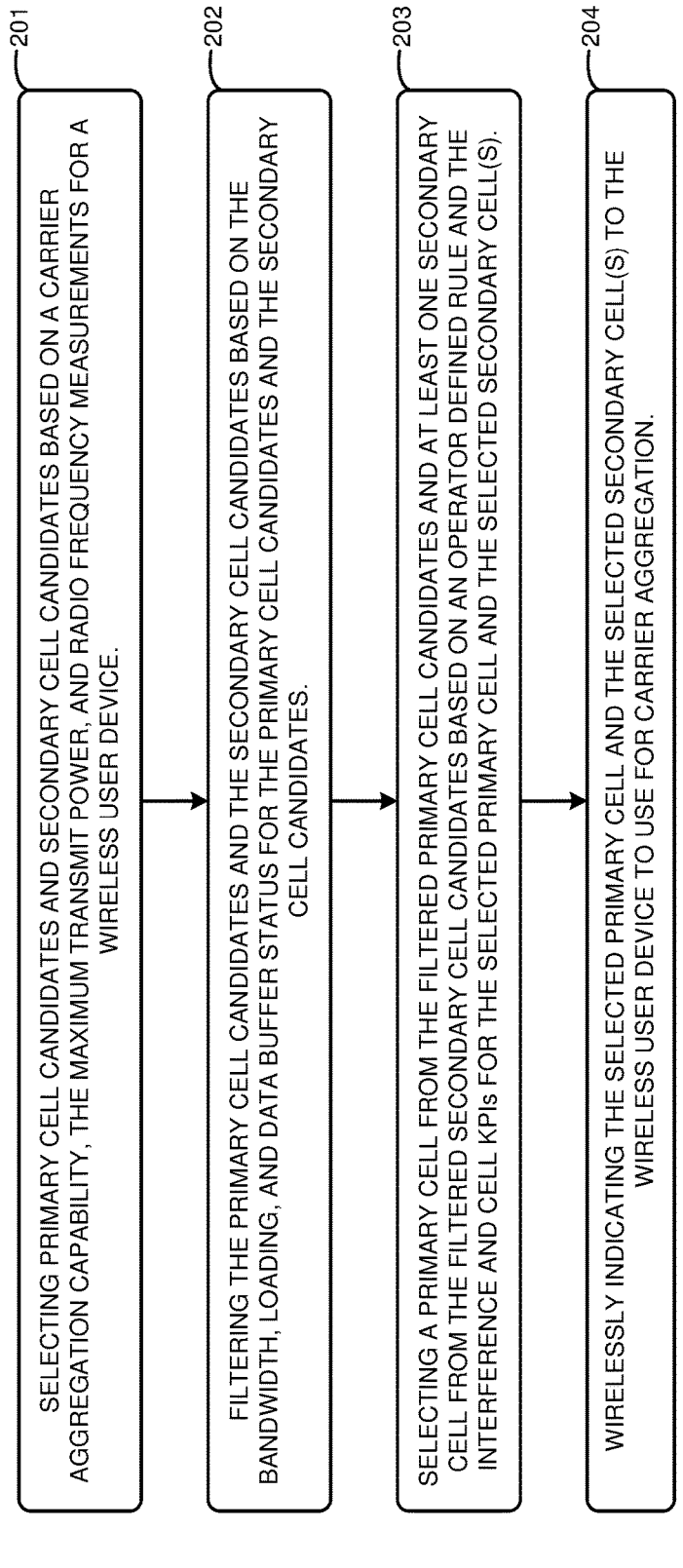

200

201
SELECTING PRIMARY CELL CANDIDATES AND SECONDARY CELL CANDIDATES BASED ON A CARRIER AGGREGATION CAPABILITY, THE MAXIMUM TRANSMIT POWER, AND RADIO FREQUENCY MEASUREMENTS FOR A WIRELESS USER DEVICE.

202
FILTERING THE PRIMARY CELL CANDIDATES AND THE SECONDARY CELL CANDIDATES BASED ON THE BANDWIDTH, LOADING, AND DATA BUFFER STATUS FOR THE PRIMARY CELL CANDIDATES AND THE SECONDARY CELL CANDIDATES.

203
SELECTING A PRIMARY CELL FROM THE FILTERED PRIMARY CELL CANDIDATES AND AT LEAST ONE SECONDARY CELL FROM THE FILTERED SECONDARY CELL CANDIDATES BASED ON AN OPERATOR DEFINED RULE AND THE INTERFERENCE AND CELL KPIs FOR THE SELECTED PRIMARY CELL AND THE SELECTED SECONDARY CELL(S).

204
WIRELESSLY INDICATING THE SELECTED PRIMARY CELL AND THE SELECTED SECONDARY CELL(S) TO THE WIRELESS USER DEVICE TO USE FOR CARRIER AGGREGATION.

FIGURE 2

COMPONENT CARRIER GROUPING FOR CARRIER AGGREGATION IN WIRELESS COMMUNICATION NETWORKS

TECHNICAL FIELD

Various embodiments of the present technology relate to wireless communication, and more specifically, to intelligently grouping uplink and downlink component carriers for carrier aggregation.

BACKGROUND

Wireless communication networks provide wireless data services to wireless user devices. Exemplary wireless data services include machine-control, internet-access, media-streaming, online gaming, and social-networking. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

Carrier aggregation is a type of wireless communication to increase the amount of data exchanged between wireless user devices and RANs. The radio frequency bands that link the RAN and user device are divided into multiple frequency blocks referred to as component carriers. The component carriers are used to carry the data and signaling between the RAN and user device. In carrier aggregation, multiple component carriers are grouped to carry data and signaling between the RAN and user device. The grouped component carriers may be from the same radio band or different radio bands. When from the same band, the component carriers may be contiguous (e.g., adjacent resource blocks) or non-contiguous (e.g., non-adjacent resource blocks).

Selecting the optimal component carriers to use for carrier aggregation is difficult. In conventional wireless communication networks, the component carriers are selected based on the user device's capability for the band as well as the received signal strength of band. However, a number of other criteria influence a component carrier's suitability for use in a carrier aggregation group. As such, conventional carrier selection methods often lead to non-optimal carrier aggregation band combinations which degrades the user experience. The difficulty in selecting component carriers is compounded by the diverse and expanding array of user device capabilities as well as the continually changing needs of the user devices. For example, the optimal component carriers to support online gaming may not be the same as the optimal component carriers to support media streaming.

Unfortunately, wireless communication networks do not efficiently select component carriers for carrier aggregation. Moreover, wireless communication networks do not effectively account for the wide array of dynamic network conditions that affect component carrier selection.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for carrier aggregation. Some embodiments comprise a method of operating a wireless access node to group component carriers for carrier aggregation. The method comprises selecting primary cell candidates and secondary cell candidates based on a carrier aggregation capability, the maximum transmit power, and radio frequency measurements for a wireless user device. The method further comprises filtering the primary cell candidates and the secondary cell candidates based on the bandwidth, loading, and data buffer status for the primary cell candidates and the secondary cell candidates. The method further comprises selecting a primary cell from the filtered primary cell candidates and at least one secondary cell from the filtered secondary cell candidates based on an operator defined rule and the interference and cell Key Performance Indicators (KPIs) for the selected primary cell and the selected secondary cell(s). The method further comprises wirelessly indicating the selected primary cell and the selected secondary cell(s) to the wireless user device to use for carrier aggregation.

Some embodiments comprise wireless access node to group component carriers for carrier aggregation. The wireless access node comprises node circuitry and radio circuitry. The node circuitry selects primary cell candidates and secondary cell candidates based on a carrier aggregation capability, the maximum transmit power, and radio frequency measurements for a wireless user device. The node circuitry filters the primary cell candidates and the secondary cell candidates based on the bandwidth, loading, and data buffer status for the primary cell candidates and the secondary cell candidates. The node circuitry selects a primary cell from the filtered primary cell candidates and at least one secondary cell from the filtered secondary cell candidates based on an operator defined rule and the interference and cell KPIs for the selected primary cell and the selected secondary cell(s). The radio circuitry wirelessly indicates the selected primary cell and the selected secondary cell(s) to the wireless user device to use for carrier aggregation.

Some embodiments comprise one or more non-transitory computer readable storage media having program instructions stored thereon to group component carriers for carrier aggregation. When executed by a computing system, the program instructions direct the computing system to perform operations. The operations comprise selecting primary cell candidates and secondary cell candidates based on a carrier aggregation capability, the maximum transmit power, and radio frequency measurements for a wireless user device. The operations further comprise filtering the primary cell candidates and the secondary cell candidates based on the bandwidth, loading, and data buffer status for the primary cell candidates and the secondary cell candidates. The operations further comprise selecting a primary cell from the filtered primary cell candidates and at least one secondary cell from the filtered secondary cell candidates based on an operator defined rule and the interference and cell KPIs for the selected primary cell and the selected secondary cell(s). The operations further comprise driving a radio to wirelessly indicate the selected primary cell and the selected secondary cell(s) to the wireless user device to use for carrier aggregation.

DESCRIPTION OF THE DRAWINGS

Many aspects of the disclosure can be better understood with reference to the following drawings. The components in the drawings are not necessarily drawn to scale. More-over, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary operation of the wireless communication network to group component carriers for carrier aggregation.

Figure 1:
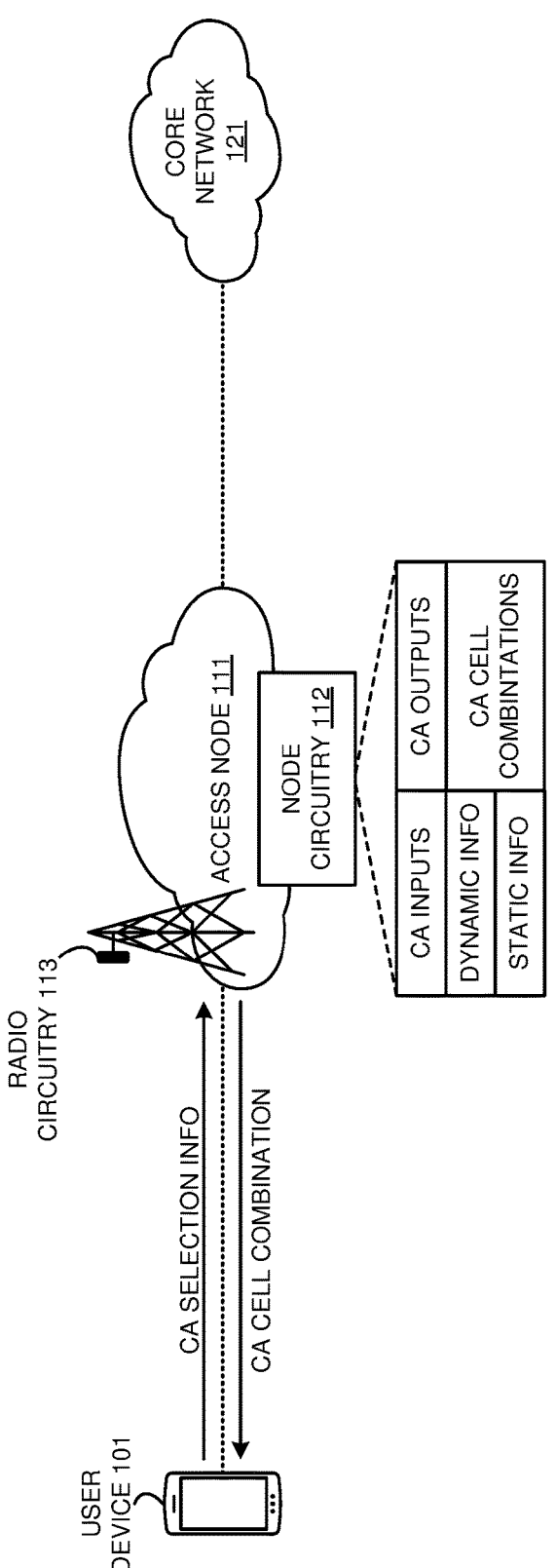
FIG. 1 illustrates a wireless communication network to group component carriers for carrier aggregation.

The drawings have not necessarily been drawn to scale. Similarly, some components or operations may not be sepa-rated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equiva-lents, and alternatives falling within the scope of the tech-nology as defined by the appended claims.

Technical Description

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appre-ciate that the features described below can be combined in various ways to form multiple variations of the invention. As a result, the invention is not limited to the specific examples described below, but only by the claims and their equiva-lents.

FIG. 1 illustrates wireless communication network 100 network to group component carriers for carrier aggregation. Wireless communication network 100 delivers services like internet-access, media-streaming, online gaming, social media, voice/video calling, machine communications, or some other wireless communications product. Wireless communication network 100 comprises user device 101, access node 111, and core network 121. Access node 111 comprises node circuitry 112 and radio circuitry 113. In other examples, wireless communication network 100 may comprise additional or different elements than those illus-trated in FIG. 1.

Various examples of network operation and configuration are described herein. In some examples, access node 111 serves a geographic area using various frequency bands. Each band is divided into multiple component carriers that carry signaling and data between node 111 and wireless user devices (e.g., user device 101). Component carriers from the same or different band may be grouped to provide carrier aggregation services to capable user devices. When user device 101 wirelessly attaches to access node 111, device 101 indicates its capability for carrier aggregation as well as dynamic and static carrier aggregation selection information to node circuitry 112 over radio circuitry 113. Node circuitry 112 hosts a table that correlates dynamic and static carrier aggregation inputs to carrier aggregation cell combinations for user device 101. Exemplary static carrier aggregation selection inputs include user device radio carrier aggregation band capabilities, user device transmit power, cell band-width, operator defined selection rules, and the like. Exem-plary dynamic carrier aggregation selection inputs include radio frequency measurements, cell loading, cell data buff-ering, cell uplink interference, and cell KPIs. Node circuitry 112 filters and selects component carriers for user device 101 based on the static and dynamic selection information received from device 101 or stored locally in node circuitry 112. Radio circuitry 113 wirelessly indicates the selected component carriers to user device 101.

Wireless communication network 100 provides wireless data and multimedia services to user device 101. Exemplary user devices include phones, computers, vehicles, robots, and sensors. Access node 111 exchanges wireless signals with user device 101 over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access node 111 is connected to core network 121 over backhaul data and signaling links. Access node 111 exchanges network signaling and user data with network elements in core network 121. Access node 111 and core network 121 may communicate via edge networks like internet backbone providers, edge computing systems, or another type of edge system to provide the backhaul data and signaling links between access node 111 and core network 121.

Access node 111 may comprise Radio Units (RUs), Dis-tributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUS handle higher wireless network layers like the Radio Resource Control (RRC), Service Data Adaption Protocol (SDAP), and Packet Data Convergence Protocol (PDCP). The CUs are communicatively coupled to network functions core network 121.

Core network 121 is representative of computing systems that provide wireless data and multimedia services to user device 101. Exemplary computing systems comprise data centers, server farms, Network Function Virtualization Infrastructure (NFVI), cloud computing networks, hybrid cloud networks, and the like. The computing systems of core network 121 store and execute the network functions to provide the wireless data services to user device 101 over access node 111. Exemplary network functions include Access and Mobility Management Function (AMF), Mobility Management Entity (MME), Session Management Function (SMF), User Plane Function (UPF), Packet Gateway (P-GW), and Serving Gateway (S-GW). Core network 121 may comprise a Fifth Generation Core (5GC) architecture, an Evolved Packet Core (EPC) architecture, and the like.

FIG. 2 illustrates process 200. Process 200 comprises an exemplary operation of wireless communication network 100 to group component carriers for carrier aggregation. The operation may vary in other examples. The operations of process 200 comprise selecting primary cell candidates and secondary cell candidates based on a carrier aggregation capability, the maximum transmit power, and radio frequency measurements for a wireless user device (step 201). The operations further comprise filtering the primary cell candidates and the secondary cell candidates based on the bandwidth, loading, and data buffer status for the primary cell candidates and the secondary cell candidates (step 202). The operations further comprise selecting a primary cell from the filtered primary cell candidates and at least one secondary cell from the filtered secondary cell candidates based on an operator defined rule and the interference and cell KPIs for the selected primary cell and the selected secondary cell(s) (step 203). The operations further comprise wirelessly indicating the selected primary cell and the selected secondary cell(s) to the wireless user device to use for carrier aggregation (step 204).

Figure 3:
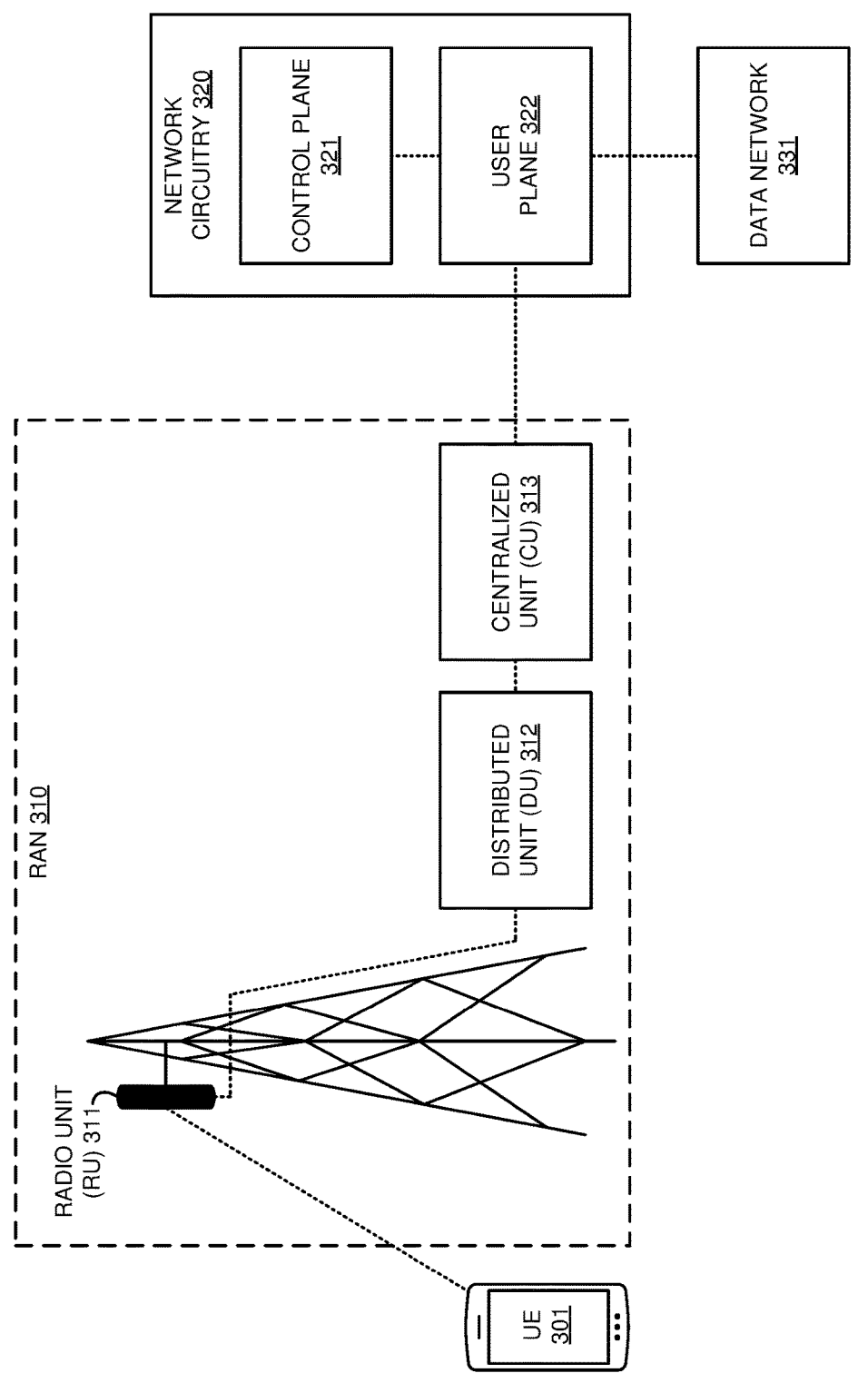
FIG. 3 illustrates a wireless communication network to group component carriers for carrier aggregation.

FIG. 3 illustrates wireless communication network 300 network to group component carriers for carrier aggregation. Wireless communication network 300 is an example of wireless communication network 100, however network 100 may differ. Wireless communication network 300 comprises User Equipment (UE) 301, RAN 310, network circuitry 320, and data network 331. RAN 310 comprises RU 311, DU 312, and CU 313. Network circuitry 320 comprises control plane 321 and user plane 322. In other examples, wireless communication network 300 may comprise additional or different elements than those illustrated in FIG. 3.

In some examples, RAN 310 selects primary and secondary cells for UE 301 to use for carrier aggregation. RAN 310 uses a combination of static and dynamic information that indicates the carrier aggregation suitability to filter and select the primary and secondary cells. In response to UE 301 attaching, RAN 310 selects candidate primary and secondary cells based on the maximum transmit power of UE 301, the signal strength for the primary and secondary cells, and UE 301's capabilities for various cell combinations. For example, RAN 310 avoids selecting candidate cells which UE 301 lacks the capability to use for carrier aggregation. Once the candidate cells are identified, RAN 310 filters the candidate cells based on their carrier aggregation suitability for UE 301. RAN 310 may filter the candidate cells based on their bandwidth, loading, and/or data buffer status in both the uplink and downlink. For example, RAN 310 may prioritize cells with higher bandwidth and lower loading over cells with lower bandwidth and higher loading. RAN 310 may remove cells as candidates that do not have sufficient bandwidth and are too heavily loaded. RAN 310 selects a primary cell and at least one secondary cell from the set of filtered candidate cells for UE 301 to use for carrier aggregation. To select the primary and secondary cells, RAN 310 may apply operator defined rules, prioritize cells with low uplink interference, and prioritize cells with better KPIs. RAN 310 wirelessly indicates the selected primary and secondary cells to UE 301. UE 301 exchanges signaling and data with RAN 310 via carrier aggregation using the selected primary and secondary cells.

Advantageously, wireless communication network 300 efficiently selects component carriers for carrier aggregation. Moreover, wireless communication network 300 effectively accounts for the wide array of dynamic network conditions that affect component carrier selection.

UE 301 and RAN 310 communicate over links using wireless/wired technologies like 5GNR, LTE, LP-WAN, WIFI, Bluetooth, and/or some other type of wireless or wireline networking protocol. The wireless technologies use electromagnetic frequencies in the low-band, mid-band, high-band, or some other portion of the electromagnetic spectrum. The wired connections comprise metallic links, glass fibers, and/or some other type of wired interface. RAN 310, control plane 321, user plane 322, and data network 331 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 301 comprises a phone, vehicle, computer, sensor, drone, robot, or another type of data appliance with wireless communication circuitry. Although RAN 310 is illustrated as a tower, RAN 310 may comprise another type of mounting structure (e.g., buildings), or no mounting structure at all. RAN 310 comprises a Fifth Generation (5G) RAN, LTE RAN, gNodeBs, eNodeBs, NB-IoT access nodes, LP-WAN base stations, wireless relays, WIFI hotspots, Bluetooth access nodes, and/or another wireless or wireline network transceiver. UE 301 and RAN 310 comprise antennas, amplifiers, filters, modulation, analog/digital interfaces, microprocessors, software, memories, transceivers, bus circuitry, and the like. Control plane 321 comprises network functions like AMF, SMF, and the like. User plane 322 comprises network functions like UPF and the like. Data network 331 comprises elements like Application Server (AS) and the like.

UE 301, RAN 310, control plane 321, user plane 322, and data network 331 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, and network functions. The microprocessors retrieve the software from the memories and execute the software to drive the operation of wireless communication network 300 as described herein.

Figure 4:
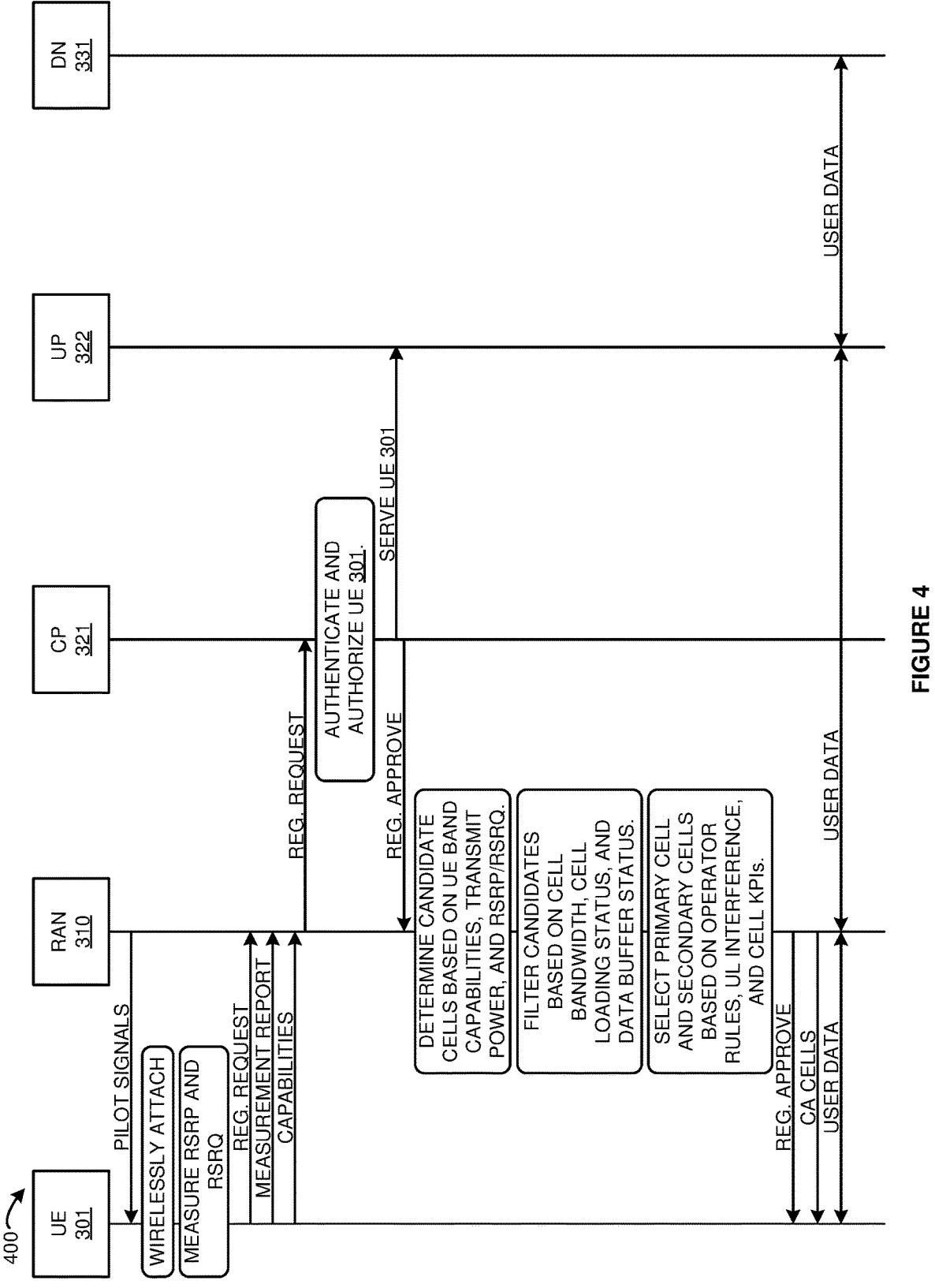
FIG. 4 illustrates an exemplary operation of the wireless communication network to select component carriers for carrier aggregation.

FIG. 4 illustrates process 400. Process 400 comprises an exemplary operation of wireless communication network 300 to group component carriers for carrier aggregation. Process 400 is an example of process 200 illustrated in FIG. 2, however process 200 may differ. In some examples, CU 313 controls DU 312 and RU 311 to broadcast pilot signals for the bands served by RAN 310. For example, RAN 310 may comprise low, mid, and high frequency bands and RU 311 may broadcast pilot signals for each of the served bands. UE 301 wirelessly receives and measures the pilot signals broadcast by RAN 310 and responsively decides to attach to RAN 310 for wireless data services. UE 301 wirelessly transfers a registration (REG.) request that comprises a measurement report and a capability list for delivery to CU 313. The measurement report indicates Received Signal Received Power (RSRP) and/or Received Signal Received Quality (RSRQ) for the pilot signals. The capability list indicates uplink and downlink bands that UE 301 can use for carrier aggregation, the maximum transmit power for UE 301, and/or other capability information for UE 301.

CU 313 caches the measurement report and capability list and forwards the registration request to control plane 321. Control plane (CP) 321 authenticates UE 301 and authorizes UE 301 for wireless data services. Control plane 321 directs user plane (UP) 322 to serve UE 301 and transfers a registration approval message to CU 313. CU 313 determines primary and secondary candidate cells for uplink and downlink communications based on the uplink and downlink bands that UE 301 can use for carrier aggregation, the transmit power of UE 301, and the RSRP and/or RSRQ of the bands provided by RAN 310. Once the primary and secondary candidates are determined, CU 313 filters the candidate cells based on their bandwidth, their loading status (e.g., number of UE), and the amount of buffered data for UE 301. CU 313 selects a primary cell and one or more secondary cells from the set of filtered cells based on operator defined rules provisioned by control plane 321, the amount of uplink interference for the cells, and cell KPIs like cell throughput, Block Error Rate (BLER), and latency. CU 313 forwards the registration accept message and indicates the selected primary and secondary carrier aggregation cells (CA cells) to UE 301. UE 301 exchanges user data with user plane 322 over RAN 310 using the primary cell and selected secondary cell(s). User plane 322 exchanges the user data with data network 331.

Figure 5:
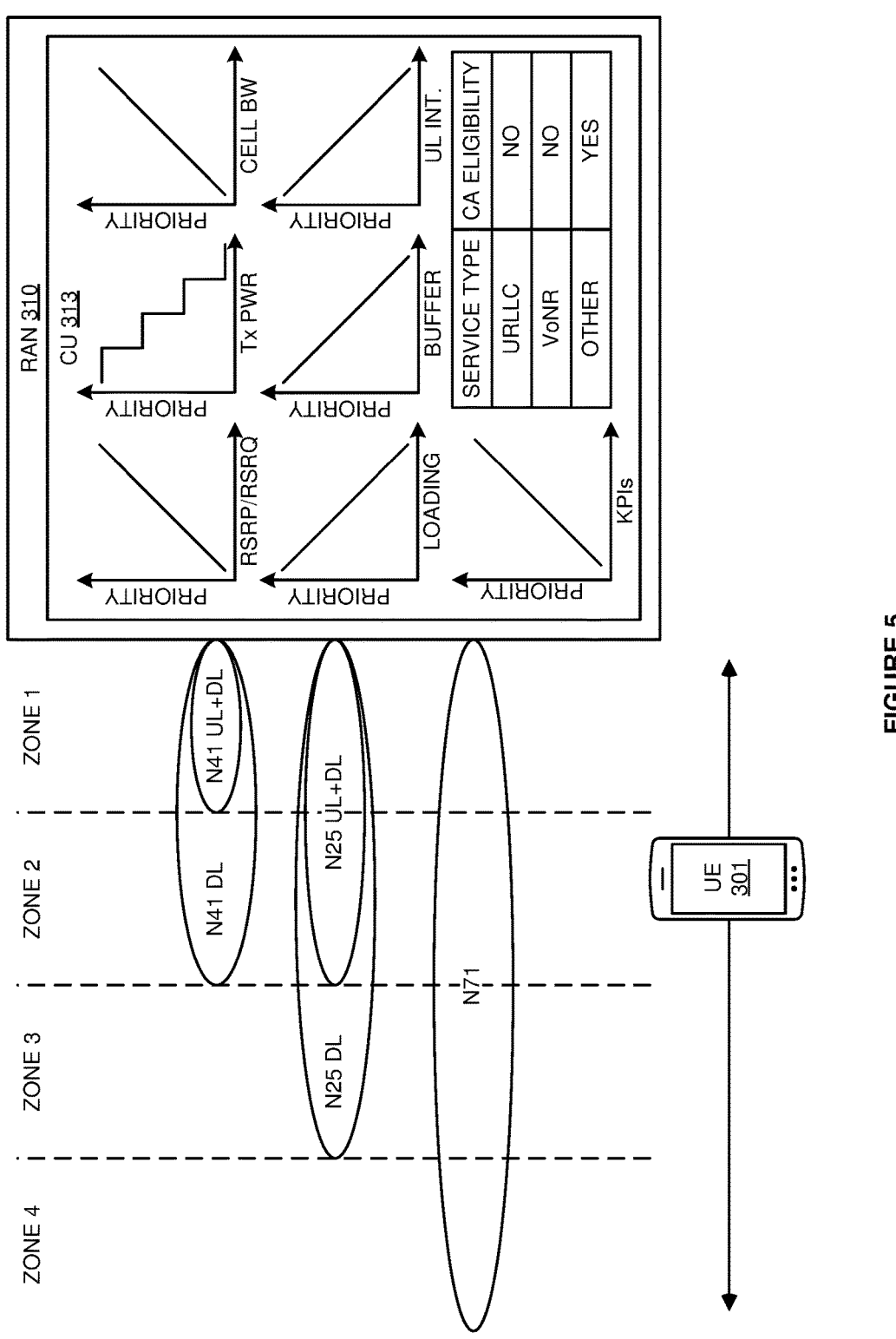
FIG. 5 illustrates an exemplary Radio Access Network in the wireless communication network.

FIG. 5 illustrates RAN 310 in wireless communication network 300 network. In some examples, CU 313 hosts a data structure that implements the graphs and chart illustrated in FIG. 5. The graphs correlate different static and dynamic factors to component carrier priority for forming carrier aggregation groups for UE 301. The x-axes of the graphs comprise RSRP/RSRQ, transmit power (Tx PWR), cell bandwidth (BW), loading, buffer status, uplink interference (UL INT.), and KPIs. The y-axes of the graphs comprise selection priorities for the carriers/cells served by RAN 310. As the RSRP/RSRQ, cell bandwidth, and cell KPIs increase for a given cell, the selection priority for that cell also increases. As the transmit power, cell loading, cell buffer status, and cell uplink interference increase for a given cell, the selection priority for that cell decreases. The chart comprises an operator defined rule that correlates service types for UE 301 to carrier aggregation eligibility. In this example, carrier aggregation is prohibited for Ultra-Reliable Low-Latency Communications (URLLC) services and Voice Over New Radio (VoNR) services and is allowed for other service types. Generally, network operators may prohibit carrier aggregation for latency sensitive service types, however the prohibited service types may differ in other examples. CU 313 inputs the dynamic and static carrier aggregation information (e.g., RSRP) into the data structure to select component carriers for UE 301.

RAN 310 provides wireless data services over a set of radio bands. In this example, the radio bands comprise N41, N25, and N71. N71 is a Frequency Division Duplex (FDD) 5G 600 MHz low-band frequency band. N25 is an FDD 5G 1900 MHz mid-band frequency band. N41 is a Time Division Duplex (TDD) 5G 2500 MHz mid-band frequency band. Other exemplary frequency bands that may be broadcast by RAN 310 include the mid-band FDD 2100 MHz (N66), the mid-band TDD 3700 MHZ (N77), the high-band Millimeter Wave (mmWave) TDD 24 GHz band, and the high-band mmWave 36 GHz band. As illustrated in FIG. 5, the service area for RAN 310 is divided into different zones (e.g., geographic regions). UE 301 may move between the different zones. Depending on which zone UE 301 resides in as well as the maximum transmit power of UE 301, UE 301 is eligible for different sets of radio bands. When in zone 1, all bands provided by RAN 310 are available to UE 301 for carrier aggregation. When in zone 2, all bands except the N41 uplink band are available for UE 301 for carrier aggregation. When in zone 3, only the N71 and N25 downlink are available for UE 301 for carrier aggregation. When in zone 4, only the N71 is available for UE 301 for carrier aggregation. When UE 301 attaches to RAN 310, UE 301 measures RSRP (and/or RSRQ) for each band provided RAN 310. UE 301 indicates the RSRP/RSRQ, its maximum transmit power, and its carrier aggregation band capabilities to CU 313. CU 313 correlates the reported RSRP to the zone that UE 301 resides in.

Figure 6:
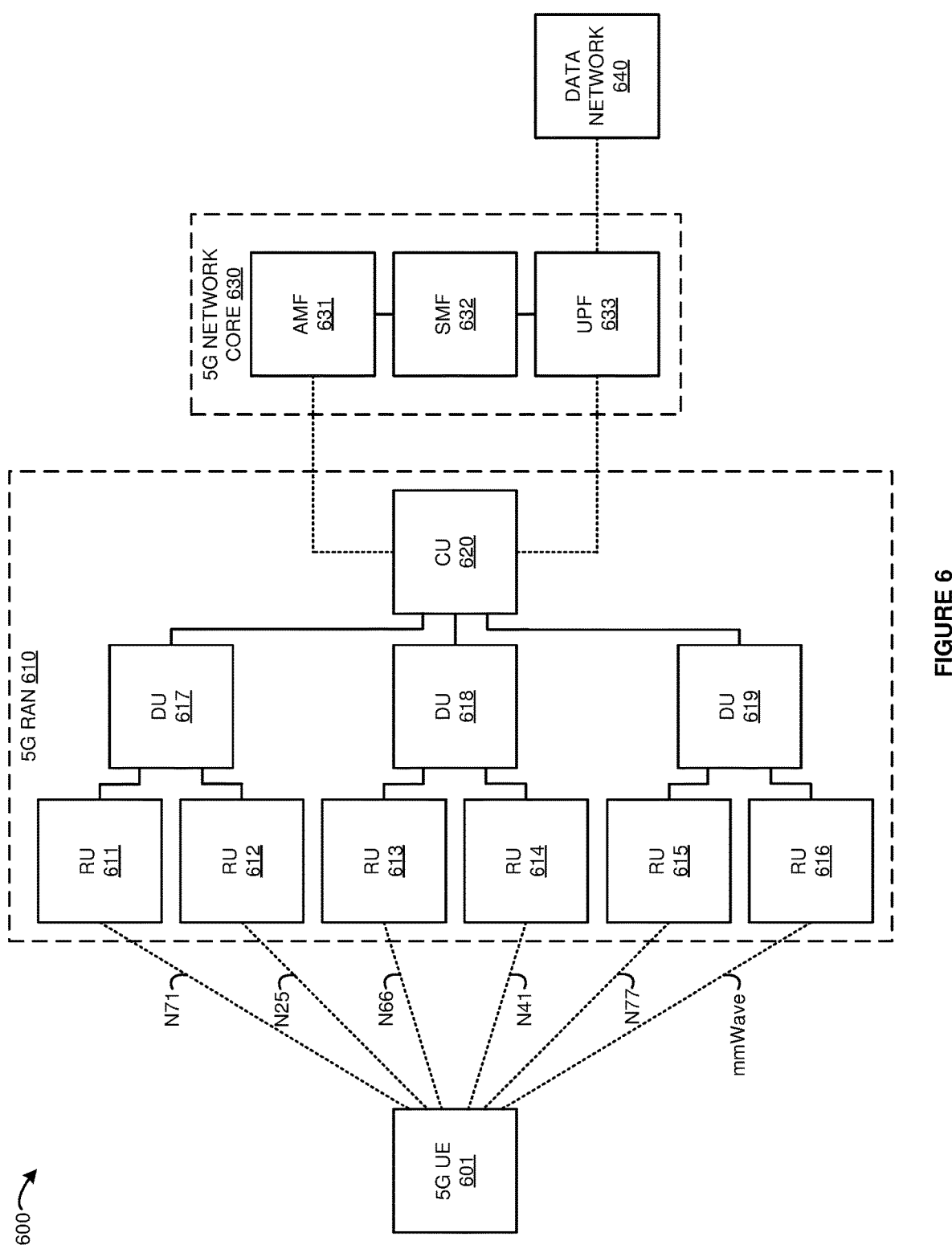
FIG. 6 illustrates a Fifth Generation (5G) communication network to group component carriers for carrier aggregation.

FIG. 6 illustrates 5G communication network 600 to group component carriers for carrier aggregation. 5G communication network 600 comprises an example of wireless communication networks 100 and 300, although networks 100 and 300 may differ. 5G communication network 600 comprises 5G UE 601, 5G RAN 610, 5G network core 630, and data network 640. 5G RAN 610 comprises RUs 611-616, DUs 617-619, and CU 620. Network core 630 comprises AMF 631, SMF 632, and UPF 633. Data network 640 comprises elements like AS. Other network functions and network elements like Authentication Server Function (AUSF), Network Slice Selection Function (NSSF), Policy Control Function (PCF), Unified Data Management (UDM), Unified Data Repository (UDR), Network Repository Function (NRF), Equipment Identity Register (EIR), Session Communication Proxy (SCP), Network Exposure Function (NEF), and Application Function (AF) are typically present in 5G network core 630 but are omitted for clarity. In other examples, 5G communication network 600 may comprise different or additional elements than those illustrated in FIG. 6.

In some examples, RU 611 provides the N71 band, RU 612 provides the N25 band, RU 613 provides the N66 band, RU 614 provides the N41 band, RU 615 provides the N77 band, and RU 616 provides a mmWave band (e.g., 24 GHz or 36 GHZ). Each band comprises contiguous and non-contiguous carriers of various channel bandwidths. CU 620 controls DUs 617-619 to broadcast System Information Blocks (SIBs) from RUs 611-616. The SIBs indicate the bands served by each of RUs 611-616 as well as band priority for their respective frequency bands. For example, the SIB broadcast by RU 611 may identify N71 as the band served by RU 611 and the attachment priority for the N71 band with respect to the other bands served by RUs 612-616. 5G UE 601 wirelessly receives the SIBs broadcast by RAN 610 and measures RSRP and RSRQ for the SIBs. UE 601 wirelessly attaches to RAN 610 via one of RUs 611-616 based on the attachment priority indicated in the SIBs and/or measured radio metrics. UE 601 exchanges attachment signaling with CU 620 over the attached to RU and DU to establish a Radio Resource Control (RRC) connection with the radio applications hosted by CU 620.

UE 601 generates a measurement report that indicates the RSRP/RSRQ for RUs 611-616. UE 601 transfers a registration request and the measurement report for delivery to CU 620. The registration request includes information like a registration type, 5G-Global Unique Temporary Identifier (GUTI), UE capabilities, Network Slice Selection Assistance Information (NSSAI) requests, Protocol Data Unit (PDU) session requests, and the like. The UE capabilities indicate that UE 601 can utilize carrier aggregation, the radio band combinations that UE 601 may use for carrier aggregation, and the maximum transmit power for UE 601. For example, UE 601 may have the capability to use N71, N25, and N41 band combinations for carrier aggregation and may indicate these bands in the registration request. CU 620 identifies and caches the carrier aggregation capabilities (e.g., the bands), the maximum transmit power, and the RSRP/RSRQ for RUs 611-616 for UE 601.

CU 620 forwards the registration request for UE 601 to AMF 631. In response to the registration request, AMF 631 transfers an identity request to UE 601 over RAN 610. UE 601 indicates its Subscriber Concealed Identifier (SUCI) to AMF 631 over RAN 610. AMF 631 interfaces with other network functions like AUSF and UDM to authenticate UE 601. In particular, AMF 631 retrieves authentication vectors including an authentication challenge, key selection criteria, and a random number as well as the Subscriber Permanent Identifier (SUPI) for UE 601. AMF 631 indicates the authentication type and transfers the authentication challenge, key selection criteria, and random number to UE 601 over RAN 610. UE 601 hashes the random number using its copy of the secret key to generate an authentication response transfers the response to AMF 631 over RAN 610. AMF 631 matches the authentication response to the expected result to authenticate UE 601. Responsive to the authentication, AMF 631 interacts with other network functions like UDM generate UE context and interacts with other network functions like PCF to select network policies for UE 601. The UE context comprises data like supported features, slice selection information, PDU session information, QoS metrics, service attributes, and the like. AMF 631 selects SMF 632 to establish the requested PDU sessions for UE 601 based on the UE context. SMF 632 selects UPF 633 to establish the PDU session for UE 601. SMF 632 informs AMF 631 that the session context for the PDU session has been created. AMF 631 transfers a registration accept message to CU 620.

In response to the registration accept message, CU 620 determines candidate components carriers for UE 601. To determine the candidate carriers, CU 620 initially filters the radio bands provided by RUs 611-616 based on the RSRP/RSRQ of the bands measured by UE 601, the maximum transmit power of UE 601, and the carrier aggregation band combination capabilities of UE 601. For example, CU 620 may filter bands that had a measured RSRP/RSRQ below a signal strength threshold, filter bands that UE lacks the capability to use for carrier aggregation, and filter uplink bands that the transmit power of UE 601 cannot support. For example, if UE 601 is on the cell edge, UE 601's transmit power may not be able to use uplink bands that serve cell center (e.g., the N41 uplink band). Once the candidate bands are determined, CU 620 filters the candidate bands to identify a set of bands most suitable for UE 601 to use for carrier aggregation. CU 620 determines the amount of buffered data for UE 601. For example, in cases of handover, user data may be buffered at RAN 610 and is subsequently transferred to UE 601 when the handover is complete. CU

620 determines if the amount of buffered data for UE 601 exceeds a buffered data threshold. When the data buffer exceeds the buffer threshold, CU 620 determines the number of connected UE, the Physical Resource Block (PRB) utilization in the downlink and the uplink, and the bandwidth for the candidate cells. CU 620 prioritizes bands with lower numbers of connected UE, lower PRB utilization, and higher bandwidth over bands with high numbers of connected UE, higher PRB utilization, and high bandwidth. CU 620 filters the candidate bands based on their number of connected UE, their PRB utilization in the downlink and uplink, and their carrier bandwidths. For example, CU 620 may filter bands when the number of connected UE exceed a threshold, PRB utilization exceeds a threshold, and/or bandwidth falls below a threshold.

Once the candidate bands have been filtered, CU 620 applies operator defined rules to determine if UE qualifies for carrier aggregation. In particular, CU 620 blocks UE 601 from using carrier aggregation when the PDU session requested by UE 601 is latency sensitive. For example, CU 620 may be provisioned with a list of service types prohibited for carrier aggregation like URLLC PDU sessions, VoNR service, augmented/virtual reality PDU sessions, and the like. When CU 620 determines that the PDU session requested by UE 601 is prohibited for carrier aggregation, CU 620 does not select component carriers for UE 601. When CU 620 determines that the PDU session requested by UE 601 is not prohibited for carrier aggregation, CU 620 ranks the filtered candidate bands based their uplink interference and cell KPIs like throughput, BLER, and latency in the uplink and downlink. Bands with lower uplink interference, higher throughput, lower BLER, and lower latency are ranked higher than bands with higher uplink interference, lower throughput, higher BLER, and higher latency. CU 620 selects a set of uplink component carriers and downlink component carriers from the filtered candidate bands for UE 601 to use for carrier aggregation based on the ranks. For example, CU 620 may select a primary uplink component carrier from the highest ranked band and select secondary uplink component carriers from the next high ranked bands.

CU 620 includes the selected primary and secondary component carriers for the uplink and downlink in the registration accept. CU 620 transfers the registration accept message for delivery to UE 601. UE 601 identifies the primary component carrier and secondary component carriers for the uplink and downlink. UE 601 establishes wireless links with ones of RUs 611-616 that correspond to the selected primary and secondary component carriers. For example, if the primary uplink carrier is in the N41, UE 601 may establish a wireless connection with RU 614. UE 601 exchanges user data over the uplink/downlink primary/secondary component carriers with CU 620 over the corresponding ones of RUs 611-616 and DUs 617-619. CU 620 exchanges the user data with UPF 633. UPF 633 exchanges the user data with data network 640.

Figure 7:
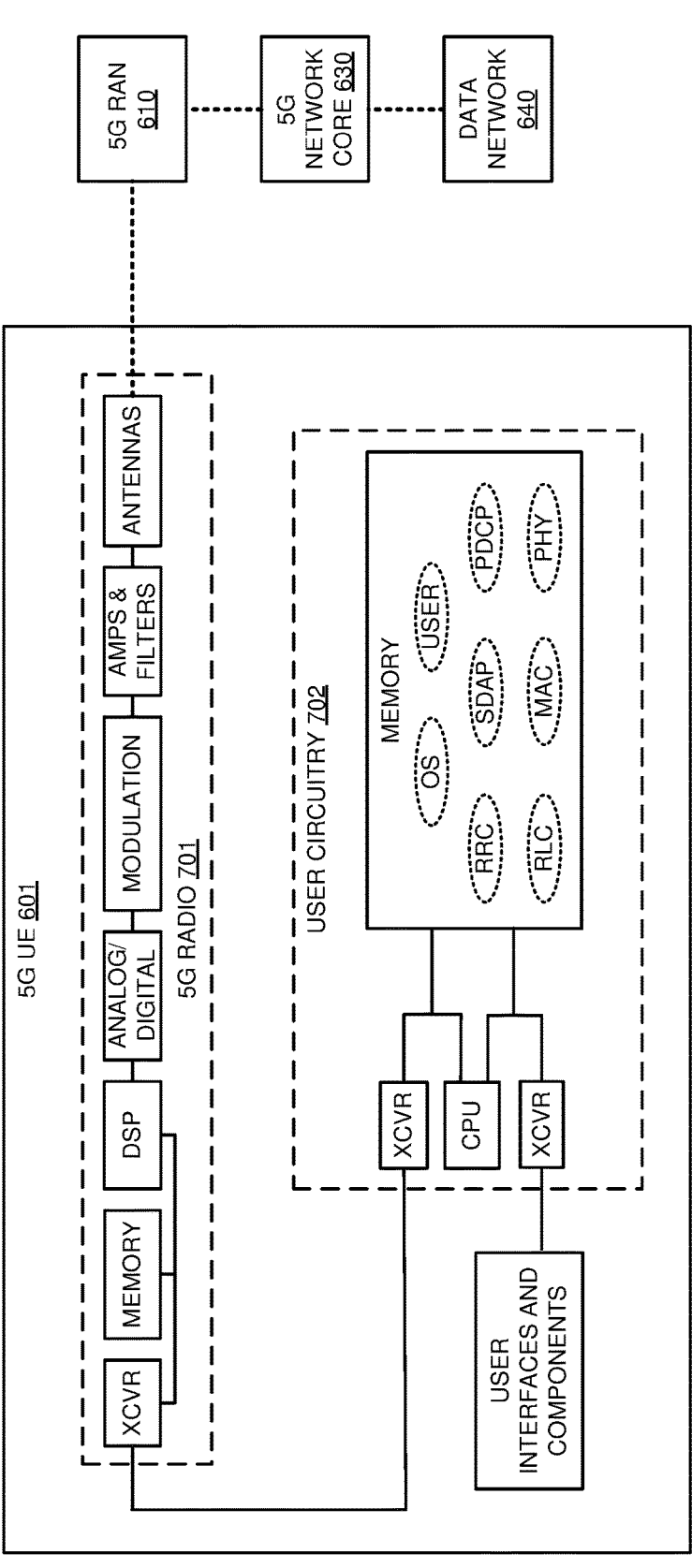
FIG. 7 illustrates a 5G User Equipment (UE) in the 5G communication network.

FIG. 7 illustrates 5G UE 601 in 5G communication network 600. UE 601 comprises an example of user device 101 illustrated in FIG. 1 and UE 301 illustrated FIG. 3, however user device 101 and UE 301 may differ. UE 601 comprises 5G radio 701 and user circuitry 702. Radio 701 comprises antennas, amplifiers, filters, modulation, analog-to-digital interfaces, Digital Signal Processors (DSP), memory, and transceivers (XCVRs) that are coupled over bus circuitry. User circuitry 702 comprises memory, CPU, user interfaces and components, and transceivers that are coupled over bus circuitry. The memory in user circuitry 702 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 701 is wirelessly coupled to 5G RAN 610 over a 5GNR link. A transceiver in radio 701 is coupled to a transceiver in user circuitry 702. A transceiver in user circuitry 702 is typically coupled to the user interfaces and components like displays, controllers, and memory.

In radio 701, the antennas receive wireless signals from 5G RAN 610 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 702 over the transceivers. In user circuitry 702, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 610 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

In some examples, UE 601 wirelessly receives SIBs broadcast by RAN 610. The RRC in UE 601 directs the PHY to measure the RSRP and RSRQ for the SIBs. The PHY measures the radio metrics for each of the SIBs and indicates the reported radio metrics to the RRC. The RRC controls the lower layer radio applications to attach to one of RUs 611-616 based on the measured radio metrics and/or priority information included in the SIBs. Upon initial attachement, the RRC participates in a Random Access Chanell (RACH) procedure with RAN 610 to assign radio resources for network registration. Once the RACH procedure is complete, the RRC transfers an RRCSetupRequest message to CU 620. The RRC receives an RRCSetup message from CU 620 to establish the RRC connection between UE 601 and CU 620. This message typically comprises data like radio bearer configuration and cell information. In response, the RRC generates and transfers an RRCSetupComplete message to CU 620. The RRCSetupComplete message includes a registration request and the measurement report. The measurement report comprises the RSRP/RSRQ for RUs 611-616. The registration request comprises the 5G GUTI, UE capabilities, NSSAI requests, and PDU session requests. The indicated capabilities include the maximum transmit power for radio 701 and band combinations for carrier aggregation in the uplink and downlink.

When UE 601 is successfully registered by network core 630, the RRC receives an RRCReconfiguration message from CU 620. The message indicates that registration was accepted and indicates the primary and secondary component carriers in the uplink and downlink for UE 601 to use for carrier aggregation. The RRC drives the lower layer radio applications (e.g., PHY) to establish wireless links with ones of RUs 611-616 based on the primary and secondary component carriers in the uplink and downlink. The RRC transfers an RRCReconfigurationComplete message for delivery to CU 620 indicating that UE 601 has successfully established radio connections with the primary and secondary cells. The RRC directs the SDAP to begin the PDU session. The SDAP drives the lower-level radio applications to exchange user data for the PDU session with CU 620 over the primary and secondary cells.

Figure 8:
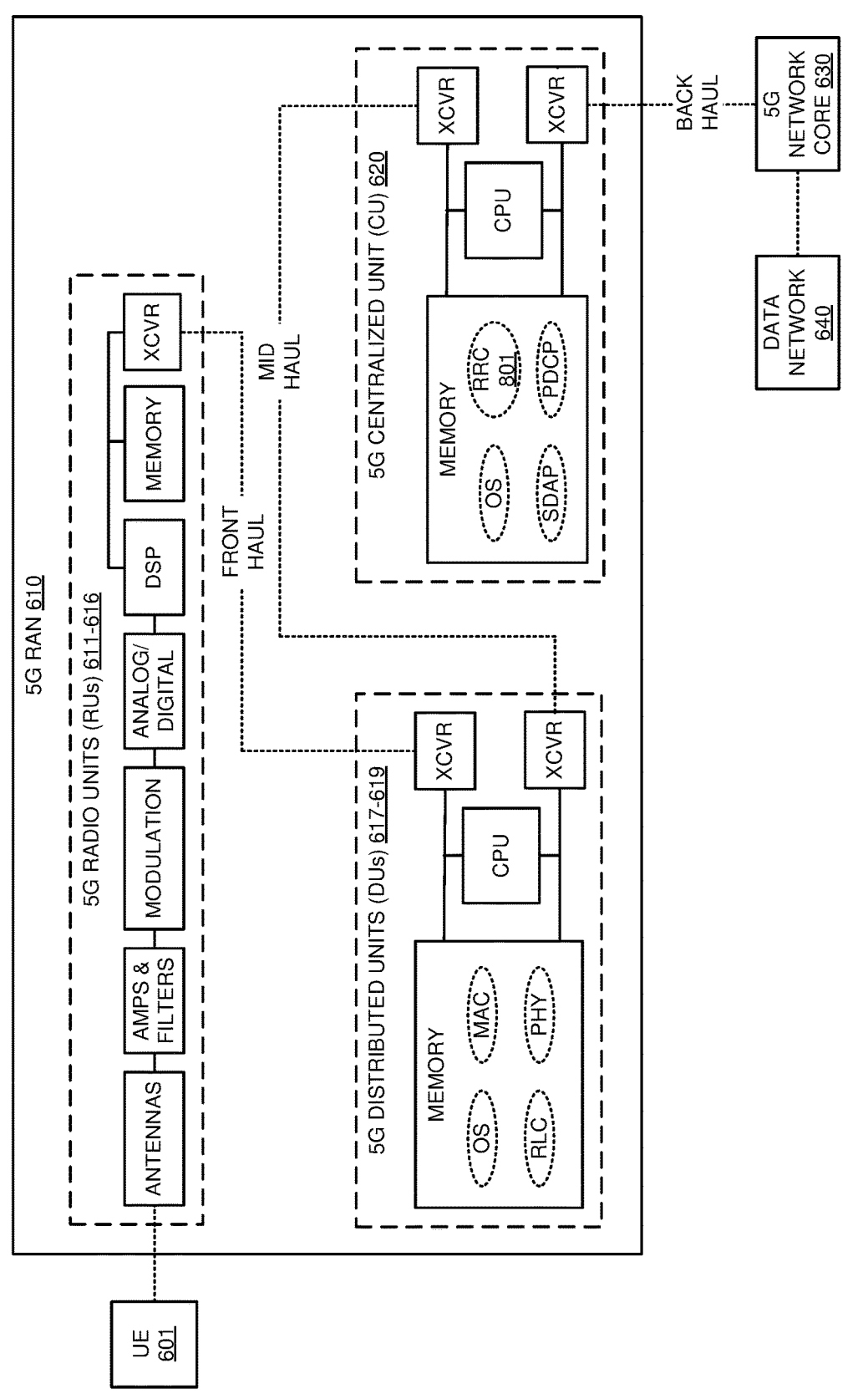
FIG. 8 illustrates a 5G RAN in the 5G communication network.

FIG. 8 illustrates 5G RAN 610 in 5G communication network 600. RAN 610 comprises an example of access node 111 illustrated in FIG. 1 and RAN 310 illustrated in FIG. 3, however access node 111 and RAN 310 may differ. RUs 611-616 comprise antennas, amplifiers, filters, modulation, analog-to-digital interfaces, DSP, memory, and transceivers (XCVRs) that are coupled over bus circuitry. The antennas in RUs 611-616 are wirelessly coupled to UE 601 over 5GNR links. Transceivers in 5G RUs 611-616 are coupled to transceivers in 5G DUs 617-619 over fronthaul links like enhanced Common Public Radio Interface (eC-PRI). The DSPs in RUs 611-616 execute their operating systems and radio applications to exchange 5GNR signals with UE 601 and to exchange 5GNR data with DUs 617-619.

For the uplink, the antennas receive wireless signals from UE 601 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DUs 617-619 over the transceivers.

For the downlink, the DSPs receive downlink 5GNR symbols from DUs 617-619. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink 5GNR signaling and data.

DUs 617-619 comprise memory, CPU, and transceivers that are coupled over bus circuitry. The memory in 5G DUs 617-619 store operating systems and 5GNR network applications like PHY, MAC, and RLC. CU 620 comprises memory, CPU, and transceivers that are coupled over bus circuitry. The memory in CU 620 stores an operating system and 5GNR network applications like PDCP, SDAP, and RRC 801. Transceivers in 5G DUs 617-619 are coupled to transceivers in RUs 611-616 over front-haul links. Transceivers in DUs 617-619 are coupled to transceivers in CU 620 over mid-haul links. A transceiver in CU 620 is coupled to network core 630 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC 801 functions include authentication, security, handover control, status reporting, QoS, network broadcasts and pages, network selection, and RAN KPI reporting.

In some examples, RRC 801 in CU 620 receives attachement signaling from UE 601. RRC 801 participates in a RACH procedure to assign radio resources to UE 601 for registration communications. RRC 801 receives an RRC-SetupRequest message from UE 601. In response, RRC 801 transfers an RRCSetup message for delivery to UE 601 to establish an RRC connection between the RRC in UE 601 and RRC 801. The RRCSetup message includes radio bearer configuration and cell information for UE 601 to use establish the RRC connection. RRC 801 receives an RRCSetupComplete message from UE 601 that includes a measurement report for RUs 611-616 and registration request. The registration request indicates UE carrier aggregation capabilities and UE maximum transmit power. RRC 801 stores the measurement report and UE capability data and then forwards the registration request to AMF 631.

When UE 601 is successfully registered by network core 630, RRC 801 receives a registration accept message for UE 601 from AMF 631. In response, RRC 801 filters the available radio bands based on the RSRP/RSRQ of the bands measured by UE 601, the maximum transmit power of UE 601, and the carrier aggregation band capabilities of UE 601 to determine carrier aggregation candidate cells. Once the candidate bands are determined, RRC 801 queries the SDAP to determine the amount of buffered data for UE 601. RRC 801 determines if the amount of buffered data for UE 601 exceeds a buffered data threshold. When the data buffer exceeds the buffer threshold, RRC 801 filters the candidate bands based on their number of connected UE, their PRB utilization in the downlink and uplink, and their carrier bandwidths. Once the candidate bands have been filtered, RRC 801 applies operator defined rules to determine if UE 601 qualifies for carrier aggregation. When RRC 801 determines UE 601 qualifies for carrier aggregation, RRC 801 ranks the filtered candidate bands based their uplink interference, throughput, BLER, and latency in the uplink and downlink. RRC 801 selects a primary and one or more secondary component carriers for the uplink and downlink based on the ranks. RRC 801 generates and transfers a RRCReconfiguration message that includes the selected primary/secondary component carriers and the registration accept message for delivery to UE 601. RRC 801 receives an RRCReconfigurationComplete message generated by UE 601 indicating that UE 601 has successfully established radio connections with the primary and secondary cells. RRC 801 directs the SDAP to serve UE 601. The SDAP drives the lower-level radio applications (e.g., PHY) to exchange user data for the PDU session with UE 601 over the primary and secondary component carriers selected by RRC 801. The SDAP exchanges the user data with UPF 623.

Figure 9:
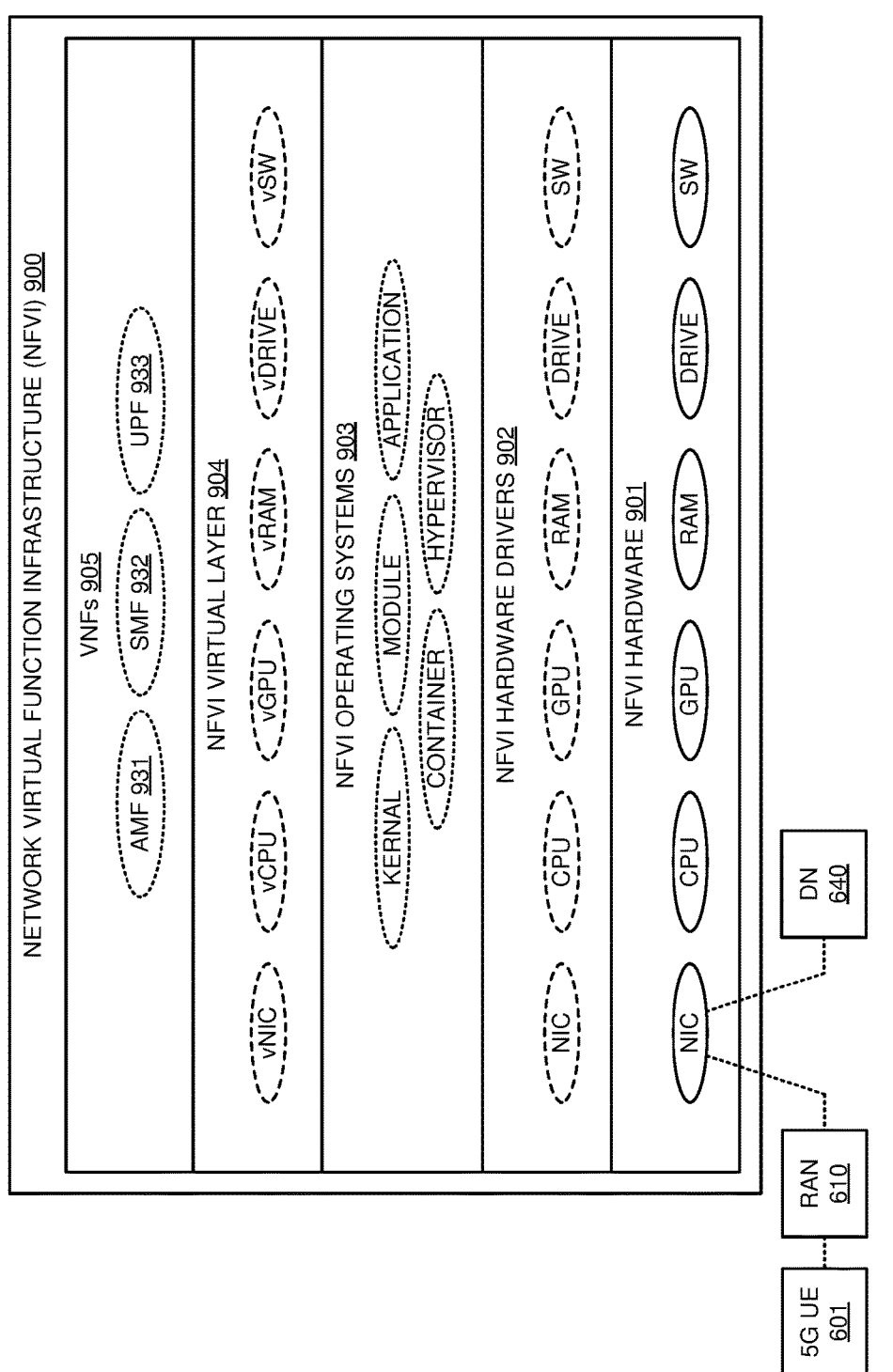
FIG. 9 illustrates a Network Function Virtualization Infrastructure (NFVI) in the 5G communication network.

FIG. 9 illustrates Network Function Virtualization Infrastructure (NFVI) 900. NFVI 900 comprises an example of core network 121 illustrated in FIG. 1 and network circuitry 320 illustrated in FIG. 3, however core network 121 and network circuitry 320 may differ. NFVI 900 comprises NFVI hardware 901, NFVI hardware drivers 902, NFVI operating systems 903, NFVI virtual layer 904, and NFVI Virtual Network Functions (VNFs) 905. NFVI hardware 901 comprises Network Interface Cards (NICs), CPU, GPU, RAM, Flash/Disk Drives (DRIVE), and Data Switches (SW). NFVI hardware drivers 902 comprise software that is resident in the NIC, CPU, GPU, RAM, DRIVE, and SW. NFVI operating systems 903 comprise kernels, modules, applications, containers, hypervisors, and the like. NFVI virtual layer 904 comprises vNIC, vCPU, vGPU, vRAM, vDRIVE, and vSW. NFVI VNFs 905 comprise AMF 931, SMF 932 and UPF 933. Additional VNFs and network elements like AUSF, NSSF, PCF, UDM, UDR, NRF, EIR, SCP, NEF, and AF are typically present but are omitted for clarity. NFVI 900 may be located at a single site or be distributed across multiple geographic locations. The NIC in NFVI hardware 901 is coupled to RAN 610 and data network 640. NFVI hardware 901 executes NFVI hardware drivers 902, NFVI operating systems 903, NFVI virtual layer 904, and NFVI VNFs 905 to form AMF 631, SMF 632, and UPF 633.

Figure 10:
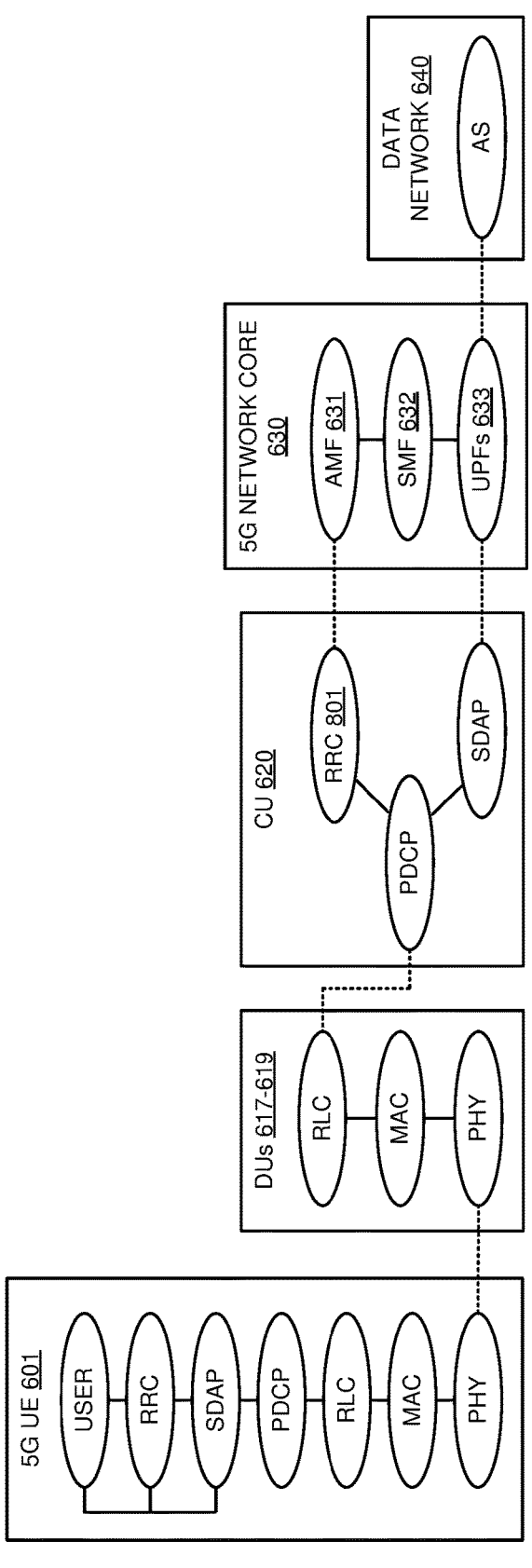
FIG. 10 illustrates an exemplary operation of the 5G communication network to group component carriers for carrier aggregation.

FIG. 10 illustrates an exemplary operation of 5G communication network 600 to group component carriers for carrier aggregation. The operation may vary in other examples. In some examples, RRC 801 drives the PDCP, RLC, MAC, and PHY in CU 620 and DUs 617-619 to broadcast SIBs over RUs 611-616. The SIBs indicate the frequency bands served by each of RANs 611-616 as well as other information like attachment priority, loading information, and the like. The RRC in UE 601 wirelessly receives the SIBs broadcast by RAN 610 over the PDCP, RLC, MAC, and PHY in UE 601. The RRC in UE 601 directs the PHY to measure the RSRP and RSRQ for the SIBs. The PHY measures the radio metrics for each of the SIBs and indicates the reported radio metrics to the RRC. The RRC controls the PDCP, RLC, MAC, and PHY to attach to RU 611 based on the RSRP for RU 611. Upon attachement, the RRC initiates a RACH procedure with RRC 801 over the PDCPs, RLCs, MACs, and PHYs to assign radio resources for network registration. Once the RACH procedure is complete, the RRC in UE 601 transfers an RRCSetupRequest message to RRC 801 over the PDCPs, RLCs, MACs, and PHYS. RRC 801 receives the request and selects bearer configuration and cell information for UE 601. RRC 801 transfers an RRC-Setup message to the RRC in UE 601 that includes the bearer configuration and cell information to establish the RRC connection.

The RRC in UE 601 establishes the RRC connection using the information received in the setup message. The RRC generates an RRCSetupComplete message that includes a registration request and measurement report. The measurement report comprises the RSRP/RSRQ for RUs 611-616. The registration request comprises the 5G GUTI, UE capabilities, NSSAI requests, and PDU session requests. The indicated capabilities include the maximum transmit power for UE 601 and band combinations for carrier aggregation in the uplink and downlink. The RRC transfers the RRCSetupComplete message to RRC 801 over the PDCPs, RLCs, MACs, and PHYs. RRC 801 stores the UE capability data and measurement report and then forwards the registration request to AMF 631.

In response to the registration request, AMF 631 transfers an identity request for UE 601 to RRC 801. RRC 801 forwards the identity request to the RRC in UE 601 over the PDCPs, RLCs, MACs, and PHYs. The RRC in UE 601 response to the request by indicating its SUCI to RRC 801 over the PDCPs, RLCs, MACs, and PHYs. RRC 801 forwards UE 601's SUCI to AMF 631. AMF 631 interacts with other network functions to retrieve authentication vectors to validate the identity of UE 601. The vectors comprise an authentication challenge, key selection criteria, a random number, and the SUPI for UE 601. AMF 631 transfers a Non-Access Stratum (NAS) Authentication Request that includes the authentication type, the authentication challenge, key selection criteria, and random number to RRC 801. RRC 801 forwards the NAS Authentication Request to the RRC in UE 601 over the PDCPs, RLCs, MACs, and PHYs. The RRC in UE 601 hashes the random number using its copy of the secret key to generate an authentication response parameter. The RRC transfers a NAS Authentication Response message that includes the authentication response parameter generated by UE 601 to RRC 801 over the PDCPs, RLCs, MACs, and PHYs. RRC 801 forwards the NAS Authentication Response to AMF 631. AMF 631 matches the authentication response parameter to the expected result to authenticate UE 601. Responsive to the authentication, AMF 631 interacts with other network functions to generate UE context and select network policies for UE 601. The UE context comprises data like supported features, slice selection information, PDU session information, QoS metrics, service attributes, and the like. AMF 631 selects SMF 632 to establish the requested PDU sessions for UE 601 based on the UE context. SMF 632 selects UPF 633 to establish the PDU session for UE 601. SMF 632 informs AMF 631 that the session context for the PDU session has been created. AMF 631 transfers a registration accept message to RRC 801.

RRC 801 receives the registration accept message for UE 601 from AMF 631. In response, RRC 801 filters the available radio bands based on the RSRP/RSRQ of the bands measured by UE 601, the maximum transmit power of UE 601, and the carrier aggregation band capabilities of UE

601 to determine carrier aggregation candidates. RRC 801 queries the SDAP to determine the amount of buffered data for UE 601. When the amount of buffered data for UE 601 exceeds the buffer threshold, RRC 801 filters the candidate bands based on their number of connected UE, their PRB utilization in the downlink and uplink, and their carrier bandwidths. RRC 801 applies operator defined rules and determines the PDU session type for UE 601 qualifies for carrier aggregation. RRC 801 ranks the filtered candidate bands based on their uplink interference, throughput, BLER, and latency in the uplink and downlink. In this example, the N41 and N25 are the highest ranked candidate bands. In response, RRC 801 selects a primary N41 carrier and secondary N41 and N25 carriers for the downlink based on their ranks. RRC 801 also selects a primary N41 carrier and a secondary N25 carrier for the uplink based on their ranks. RRC 801 generates a RRCReconfiguration message that includes the selected primary/secondary component carriers and the registration accept message for UE 601. RRC 801 transfers the RRCReconfiguration message to the RRC in UE 601 over the PDCPs, RLCs, MACs, and PHYs.

The RRC in UE 601 receives the RRCReconfiguration message and identifies the primary and secondary component carriers to use for carrier aggregation. Since RU 612 provides the N25 band and RU 614 provides the N41 band, the RRC drives the PDCP, RLC, MAC, and PHY to establish wireless links with RUs 612 and 614 and disconnect from RU 611. The RRC transfers an RRCReconfigurationComplete message for delivery to RRC 801 over the PDCPs, RLCs, MACs, and PHYs indicating that UE 601 has successfully established radio connections with the primary and secondary cells.

Since registration is complete, UE 601 begins the PDU session. A user application in UE 601 generates uplink data for the PDU session. The RRC in UE 601 directs the SDAP to exchange data for the PDU session. The SDAP transfers the uplink data for the PDU session to the SDAP in CU 620 over the PDCPs, RLCs, MACs, and PHYs using the primary N41 uplink carrier and the secondary N25 uplink carrier (e.g., by carrier aggregation). The SDAP in CU 620 transfers the uplink data to UPF 623. UPF 623 transfers the uplink data to the AS in data network 640. The AS generates downlink data for the PDU session and transfers the downlink data to UPF 623. UPF 623 transfers the downlink data to the SDAP in CU 620. The SDAP in CU 620 transfers the downlink data to the SDAP in UE 601 over the PDCPs, RLCs, MACs, and PHYs using the primary N41 downlink carrier and the secondary N41 and N25 downlink carriers.

The wireless data network circuitry described above comprises computer hardware and software that form special-purpose network circuitry to group component carriers for carrier aggregation. The computer hardware comprises processing circuitry like CPUs, DSPs, GPUS, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to group component carriers for carrier aggregation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to group component carriers for carrier aggregation, the method comprising:

selecting primary cell candidates and secondary cell candidates based on a carrier aggregation capability, a maximum transmit power, and radio frequency measurements for a wireless user device;

filtering the primary cell candidates and the secondary cell candidates based on bandwidth, loading, and data buffer status for the primary cell candidates and the secondary cell candidates;

selecting a primary cell from the filtered primary cell candidates and at least one secondary cell from the filtered secondary cell candidates based on an operator defined rule, interference, and cell Key Performance Indicators (KPIs) for the selected primary cell and the selected at least one secondary cell; and wirelessly indicating the selected primary cell and the selected at least one secondary cell to the wireless user device to use for the carrier aggregation.

2. The method of claim 1 further comprising exchanging user device with the wireless user data over the selected primary cell and the selected at least one secondary cell and exchanging the user data with network circuitry.

3. The method of claim 1 further comprising wirelessly receiving a measurement report from the wireless user device that comprises the maximum transmit power and the radio frequency measurements.

4. The method of claim 1 wherein the radio frequency measurements comprise Received Signal Received Power (RSRP) and Received Signal Received Quality (RSRQ) for cells served by the wireless access node.

5. The method of claim 1 wherein the carrier aggregation capability indicates ones of the cells served by the wireless access node that can be used by the wireless user device for the carrier aggregation.

6. The method of claim 1 wherein the cell loading status comprises an amount of connected devices and Physical Resource Block (PRB) utilization percent for the primary cell candidates and the secondary cell candidates.

7. The method of claim 1 wherein the operator defined rule prioritizes ones of the filtered primary cell candidates and ones of the filtered secondary cell candidates based on a service type for the wireless user device.

8. The method of claim 1 wherein:

the operator defined rule prohibits the carrier aggregation for the wireless user device when a service type for the wireless user device comprises a low-latency service;

when the service type for the wireless user device comprises a low-latency service:

selecting the primary cell from the filtered primary cell candidates and not selecting the at least one secondary cell from the filtered secondary cell candidates based on the operator defined rule, the interference, and the cell KPIs for the selected primary cell; and wirelessly indicating the selected primary cell and not indicating the at least one secondary cell to the wireless user device.

9. The method of claim 8 wherein the low-latency service comprises at least one of an Ultra-Reliable Low-Latency Communication (URLLC) service or a Voice Over New Radio (VoNR) service.

10. The method of claim 1 wherein the cell KPIs comprise cell throughput, Block Error Rate (BLER), and cell latency.

11. A wireless access node to group component carriers for carrier aggregation, the wireless access node comprising:

node circuitry to:

select primary cell candidates and secondary cell candidates based on a carrier aggregation capability, a maximum transmit power, and radio frequency measurements for a wireless user device;

filter the primary cell candidates and the secondary cell candidates based on bandwidth, loading, and data buffer status for the primary cell candidates and the secondary cell candidates;

select a primary cell from the filtered primary cell candidates and at least one secondary cell from the filtered secondary cell candidates based on an operator defined rule, interference, and cell Key Performance Indicators (KPIs) for the selected primary cell and the selected at least one secondary cell; and radio circuitry to:

wirelessly indicate the selected primary cell and the selected at least one secondary cell to the wireless user device to use for the carrier aggregation.

12. The wireless access node of claim 11 wherein:

the radio circuitry is configured to exchange user data with the wireless user device over the selected primary cell and the selected at least one secondary cell; and the node circuitry is configured to exchange the user data with network circuitry.

13. The wireless access node of claim 11 wherein the radio circuitry is configured to wirelessly receive a measurement report from the wireless user device that comprises the maximum transmit power and the radio frequency measurements.

14. The wireless access node of claim 11 wherein the radio frequency measurements comprise Received Signal Received Power (RSRP) and Received Signal Received Quality (RSRQ) for cells served by the wireless access node.

15. The wireless access node of claim 11 wherein the carrier aggregation capability indicates ones of the cells served by the wireless access node that can be used by the wireless user device for the carrier aggregation.

16. The wireless access node of claim 11 wherein the cell loading status comprises an amount of connected devices and Physical Resource Block (PRB) utilization percent for the primary cell candidates and the secondary cell candidates.

17. The wireless access node of claim 11 wherein the operator defined rule prioritizes ones of the filtered primary cell candidates and ones of the filtered secondary cell candidates based on a service type for the wireless user device.

18. The wireless access node of claim 11 wherein:

the operator defined rule prohibits the carrier aggregation for the wireless user device when a service type for the wireless user device comprises a low-latency service;

the low-latency service comprises at least one of an Ultra-Reliable Low-Latency Communication (URLLC) service or a Voice Over New Radio (VoNR) service;

when the service type for the wireless user device comprises a low-latency service:

the node circuitry is configured to select the primary cell from the filtered primary cell candidates and not select the at least one secondary cell from the filtered secondary cell candidates based on the operator defined rule, the interference, and the cell KPIs for the selected primary cell; and the radio circuitry is configured to wirelessly indicate the selected primary cell and not indicate the at least one secondary cell to the wireless user device.

19. The wireless access node of claim 11 wherein the cell KPIs comprise cell throughput, Block Error Rate (BLER), and cell latency.

20. One or more non-transitory computer readable storage media having program instructions stored thereon to group component carriers for carrier aggregation, wherein the program instructions, when executed by a computing system, direct the computing system to perform operations, the operations comprising:

selecting primary cell candidates and secondary cell candidates based on a carrier aggregation capability, a maximum transmit power, and radio frequency measurements for a wireless user device;

filtering the primary cell candidates and the secondary cell candidates based on bandwidth, loading, and data buffer status for the primary cell candidates and the secondary cell candidates;

selecting a primary cell from the filtered primary cell candidates and at least one secondary cell from the filtered secondary cell candidates based on an operator defined rule, interference, and cell Key Performance Indicators (KPIs) for the selected primary cell and the selected at least one secondary cell; and driving a radio to wirelessly indicate the selected primary cell and the selected at least one secondary cell to the wireless user device to use for the carrier aggregation.

\*   \*   \*   \*   \*